US009076329B2

(12) United States Patent
Fastenrath et al.

(10) Patent No.: US 9,076,329 B2
(45) Date of Patent: Jul. 7, 2015

(54) METHOD AND DEVICE FOR FUSION OF TRAFFIC DATA WHEN INFORMATION IS INCOMPLETE

(75) Inventors: Ulrich Fastenrath, Bonn (DE); Markus Becker, Essen (DE)

(73) Assignee: DEUTSCHE TELEKOM AG, Bonn (DE)

( * ) Notice: Subject to any disclaimer, the term of this patent is extended or adjusted under 35 U.S.C. 154(b) by 1308 days.

(21) Appl. No.: 12/374,643

(22) PCT Filed: Dec. 28, 2006

(86) PCT No.: PCT/DE2006/002327
§ 371 (c)(1), (2), (4) Date: Jan. 21, 2009

(87) PCT Pub. No.: WO2008/011850
PCT Pub. Date: Jan. 31, 2008

(65) Prior Publication Data

US 2009/0287403 A1 Nov. 19, 2009

(30) Foreign Application Priority Data

Jul. 21, 2006 (DE) ........................ 10 2006 033 744

(51) Int. Cl.
*G06F 19/00* (2011.01)
*G06G 7/70* (2006.01)
(Continued)

(52) U.S. Cl.
CPC .................................... *G08G 1/0104* (2013.01)

(58) Field of Classification Search
CPC .......... G08G 1/0104; G08G 1/096716; G08G 1/096775; G08G 1/096741; G08G 1/20; G08G 1/096811; G08G 1/096822; G08G 1/127; G08G 1/0969; G08G 1/096844; G08G 1/0962; G08G 1/09675; G08G 1/16; G08G 1/02; G08G 5/0013; G08G 5/0043; G08G 5/0082; G08G 5/0026; G08G 5/065
USPC ......................... 701/117–120, 423, 473, 479; 340/995.1, 995.11, 995.12, 995.13; 382/104; 434/220, 305; 235/99 A
See application file for complete search history.

(56) References Cited

U.S. PATENT DOCUMENTS 6,311,127 B1 * 10/2001 Stratton et al. ................ 701/479
6,317,686 B1 * 11/2001 Ran ............................... 701/533
(Continued)

FOREIGN PATENT DOCUMENTS

DE 19905284 9/1999
DE 10002918 8/2001
(Continued)

OTHER PUBLICATIONS

Reinhart D. Kuehne, "Data Fusion Techniques for Advanced Traffic Control System", Proceedings of 9th Symposium on Control in Transportation Systems Jun. 13-15, 2000, Braunschweig, Germany, 2000, vol. 2, Jun. 2000, pp. 337-342, XP0009082712.
(Continued)

*Primary Examiner* — Jeffrey Shapiro
(74) *Attorney, Agent, or Firm* — Leydig, Voit & Mayer, Ltd.

(57) ABSTRACT

A method for merging imprecisely localized traffic reports with precisely localized traffic data includes obtaining a plurality of possible positions (x) of the localized traffic reports having imprecise position indications. The plurality of possible positions is evaluated using overlap functions. Substantially precise positions for the localized traffic reports are defined by solving an extremum problem.

3 Claims, 2 Drawing Sheets

(51) Int. Cl.

| | |
|---|---|
| ***G06G 7/76*** | (2006.01) |
| ***G08G 1/00*** | (2006.01) |
| ***G08G 1/01*** | (2006.01) |

(56) References Cited

U.S. PATENT DOCUMENTS

| | | | | |
|---|---|---|---|---|
| 6,420,999 | B1 * | 7/2002 | Vayanos | 342/357.31 |
| 6,629,034 | B1 * | 9/2003 | Kozak et al. | 701/537 |
| 6,882,930 | B2 * | 4/2005 | Trayford et al. | 701/117 |
| 7,363,144 | B2 * | 4/2008 | Liu et al. | 701/117 |
| 2002/0026278 | A1 * | 2/2002 | Feldman et al. | 701/117 |
| 2002/0177950 | A1 * | 11/2002 | Davies | 701/213 |
| 2003/0171870 | A1 * | 9/2003 | Gueziec | 701/202 |
| 2003/0216857 | A1 | 11/2003 | Feldman et al. | |
| 2006/0167784 | A1 * | 7/2006 | Hoffberg | 705/37 |
| 2006/0176817 | A1 * | 8/2006 | Liu et al. | 370/235 |
| 2007/0293958 | A1 * | 12/2007 | Stehle et al. | 700/30 |
| 2009/0099760 | A1 * | 4/2009 | Lederman et al. | 701/118 |

FOREIGN PATENT DOCUMENTS

| | | |
|---|---|---|
| DE | 102004046357 | 4/2006 |
| DE | 102005009604 | 9/2006 |

OTHER PUBLICATIONS

International Search Report for International No. PCT/DE2006/002327 mailed on May 2, 2007.

* cited by examiner

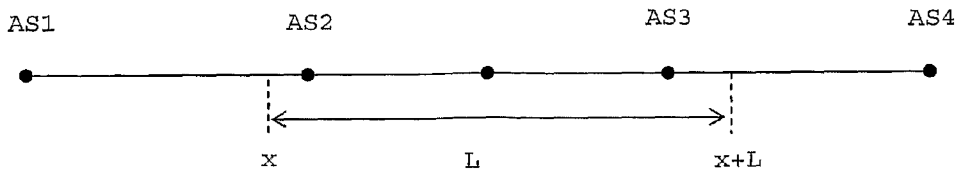
*Fig. 1*
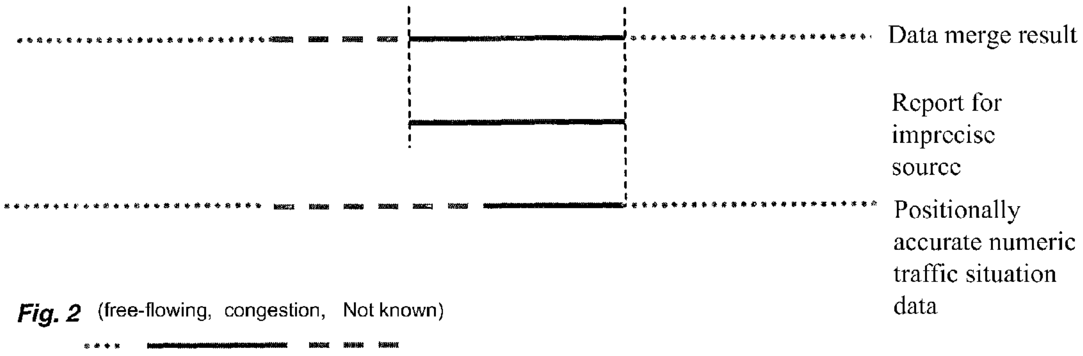
*Fig. 2* (free-flowing, congestion, Not known)

METHOD AND DEVICE FOR FUSION OF TRAFFIC DATA WHEN INFORMATION IS INCOMPLETE

CLAIM OF PRIORITY

This application claims the benefit of priority, under 35 U.S.C. §371, of International Application No. PCT/DE2006/002327, filed Dec. 28, 2006, which claims the benefit of priority to German Patent Application No. DE 10 2006 033 744.1, filed on Jul. 21, 2006. The International Application published in the German language as Publication No. WO/2008/011850 on Jan. 31, 2008.

FIELD

The invention relates to a method and a device for merging traffic data when information is incomplete, wherein information from different sources are mapped to functions for the purpose of obtaining a result on the basis of these functions.

BACKGROUND

The real-time generation of traffic information for information or navigation services is usually based on multiple data sources for the purpose of achieving the best possible quality. These data sources can be of a varying nature, for example human observation (police, traffic congestion scouts) on the one hand, and automatic measurement of traffic data (stationary sensors, floating cars) on the other hand. This results in both apparent and actual conflicts between individual sources, and certain information elements can be supplied only by one source, while other elements can be supplied only by the other source. Thus, for example, the cause of a traffic disturbance is typically accessible only to human observation, while the average speed is typically determined only by an automatic measurement system. This gives rise to the requirement to assign information from different sources to each other.

For this purpose, DE 100 02 918 C2 proposes a method for taking into account different sources with the aid of the degree of spatial overlap. However, it leaves open the question of how the merging of data from one source having a higher spatial accuracy and data from a source having a lower spatial accuracy should be accomplished.

A corresponding example is shown below. The police reports "5 kilometers of congestion between junction 1 and junction 5". Between the two junctions lie 30 kilometers of highway and 3 additional junctions—the position of the traffic disturbance is therefore very imprecisely determined. At the same time, sensors report 3 kilometers of congestion and 20 kilometers of freely moving traffic on the highway section, while 7 kilometers are not monitored. Which information should be forwarded to the service? Where exactly does the traffic disturbance lie, and which stretch of road is affected? The present invention can satisfy one or more of these and other needs.

SUMMARY

In an embodiment, the present invention provides a method for merging imprecisely localized traffic reports with precisely localized traffic data. The method includes obtaining a plurality of possible positions (x) of the localized traffic reports having imprecise position indications. The plurality of possible positions is evaluated using overlap functions. Substantially precise positions for the localized traffic reports are defined by solving an extremum problem.

BRIEF DESCRIPTION OF THE DRAWINGS

FIG. 1 illustrates a schematic representation of an imprecise source of traffic information, which reports a disturbance of length L between junctions AS1 and AS4 in accordance with an embodiment of the invention;

FIG. 2 illustrates a schematic representation of a data merging operation in accordance with an embodiment of the invention.

DETAILED DESCRIPTION

Figure 3:
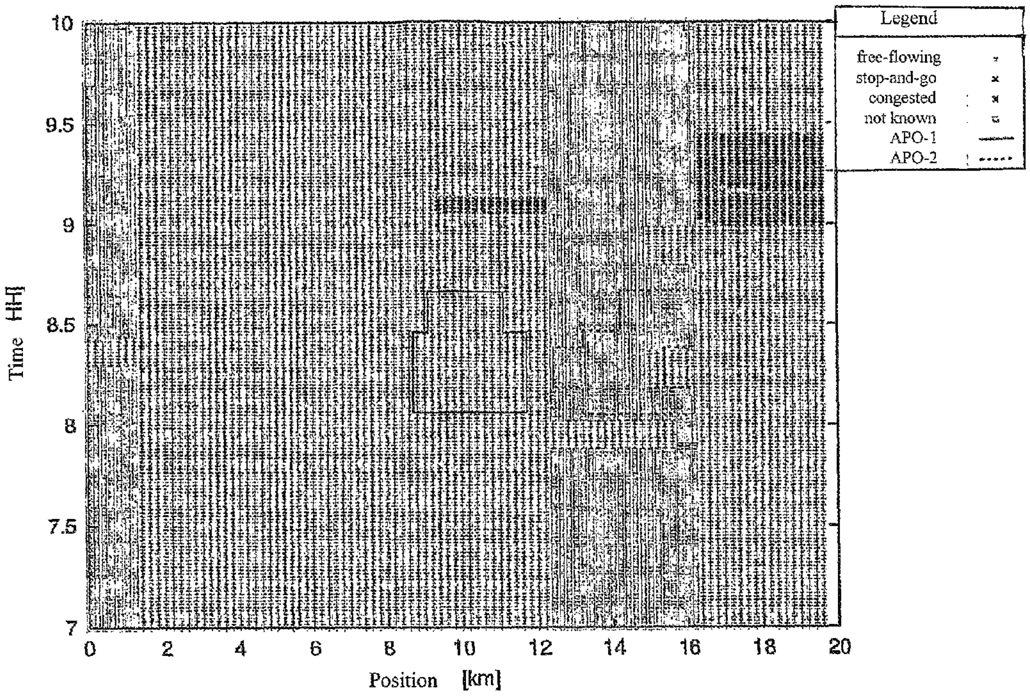
FIG. 3 illustrates in accordance with an embodiment of the invention a traffic situation data and reports on the A555 from Cologne to Bonn on Jan. 10, 2005.

An embodiment of the present invention overcomes the aforementioned disadvantages of the prior art.

In particular, a method embodying the present invention provides for the positionally accurate determination of traffic situation data, taking into account a plurality of traffic reports having imprecise position indications, which must be merged to the best possible extent. The method includes at least the following steps:

Taking into account all possible positions of the traffic reports having imprecise position indications. This may be done on the basis of kilometer data. However, the invention is not so limited and other geophysical metrics can be used as is readily understood by persons of skill in the art.

Evaluation of these positions with the aid of multiple overlap functions. Functions of this type are combined to form an evaluation function. Based on these functions and certain parameters, optimum, precise positions are found for traffic reports having imprecise position indications by solving an extremum problem. In doing this, the standard method may be used to find the extrema.

Embodiments of the invention provide optimum achievement of the data merging object in the case of incomplete information.

To generally illustrate this achievement, the situation in FIG. 1 is considered.

FIG. 1 illustrates an imprecise source of traffic information reports a disturbance of length L between junctions AS1 and AS4.

In this situation, it could be assumed that the traffic disturbance covers junctions AS2 and AS3, since it would naturally otherwise have been reported between AS1 and AS3 or AS2 and AS4. In fact, however, this is not always the case. In practice, situations frequently occur in which the distance between AS2 and AS3 is greater than L. Due to such practical problems, all positions of x=location (AS1) to x+L=location (AS4) must be viewed as being equivalent for the time being.

In the next step, the compatibility with the positionally accurate, numeric traffic situation data—if available—is checked as follows for all these possible positions:

1. Confirmation: For each possible position x within the permissible value range, a function b(x) is ascertained which indicates the portion of the reported disturbance that is confirmed by the traffic situation data.
2. Gap closing: For each possible position x within the permissible value range, a function n(x) is ascertained which indicates the portion of the reported disturbance that cannot be refuted by existing traffic situation data (unknown, due to nonexistent detection).

3. Refutation: For each possible position x within the permissible value range, a function w(x) is ascertained which indicates the portion of the reported disturbance that can be refuted by the existing traffic situation data.

The following relation applies to all x's: b(x)+w(x)+n(x)=1.

Below is an example of an embodiment of the present invention:

Functions b, n and w indicate the degree of spatial overlap. It is assumed that a poorly localizable report having length indication "10 kilometers" is placed at position x for test purposes, and it turns out that 5 of the 10 kilometers are uncheckable because no precisely localizable data is available, 4 of the 10 kilometers match precisely localizable data, and 1 of the 10 kilometers conflicts with accurately localizable data. In this case, n(x)=0.5, b(x)=04 and w(x)=0.1. The general condition n(x)+b(x)+w(x)=1 is therefore met, in particular, for this x.

All three criteria are weighted and combined into the following extremum problem (the solution designated as x is sought):

$$Ax' \in [x_1, x_2]: \{fapo(x') > fapo(x)\} \vee \{(fapo(x') = fapo(x)) \wedge (x' > x)\},$$

$$fapo(x) = g_b b(x) + g_n n(x) + g_w w(x),$$

$$x_1 = \min(km_1, km_3 - L),$$

$$x_2 = \min(km_1 + L, km_3).$$

Where:

$g_b$ Weight of criterion "confirmation"

$g_n$ Weight of criterion "gap-closing"

$g_w$ Weight of criterion "refutation"

b(x) Portion of reported disturbance that is confirmed by the traffic situation data for an assumed position x.

w(x) Portion of the reported disturbance that is refuted by traffic situation data for an assumed position x.

n(x) Portion of the reported disturbance that is neither confirmed nor refuted by traffic situation data for an assume position x (unknown).

x Possible position for the upstream end of the reported disturbance.

In this case, weighting factors gx are definable by a-priori knowledge of the quality of a source. Thus, positionally imprecise disturbances reported by the police are usually credible, and an attempt should be made to confirm them; however, police reports are not usually made in a timely fashion. Other criteria for gx are the (originating) position of disturbances (disturbances originate at bottlenecks, which is why they are preferably positioned as far downstream as possible) and requirements concerning the quality of the end product (e.g., correctness could be more important that completeness, in which case confirmation gb would be weighted heavily). Subjecting the distribution to the categories of "confirmation", "unknown" and "refutation" to statistical analysis from time to time makes it possible to check the assumptions made for setting the weights and to make adjustments, if necessary.

The extremum for x may be found either using common optimization calculation methods ("curve discussion"), or by completely calculating the target function (asdasd$f_{apo}$(x), using an increment of, for example, 1 meter, which no longer presents any difficulties for today's computers.

The data $km_1$, indicates the positions of the junctions. L indicates the length of the possible disturbance.

A position x of the traffic disturbance is found thereby which—controlled via the weighting factors—is effectively confirmed by the positionally accurate numeric traffic situation data or, if this is not successful to a sufficient extent, at least does not refute it.

After positioning the report from the imprecise source, the merging with the positionally accurate numeric traffic situation data is carried out as follows. Wherever the imprecisely localized report competes with lack of knowledge from the traffic situation estimate, the relevant portion of the report is taken as the end product. At all other points, the numeric traffic situation data is given priority.

FIG. 2 and FIG. 3 show a traffic disturbance that occurred on Jan. 10, 2005 due to an accident on the A555 from Cologne to Bonn, shortly after the Bornheim/Alfter junction (~kilometer 16). Direct observation revealed that the traffic disturbance was located in the area of kilometers 13 to 17. No stationary measurement infrastructure is located in this area.

The police reported first a three-kilometer and then a two-kilometer disturbance in the time period from 8:03 to 8:28 a.m. between Cologne-Godorfand Bonn-Nord. If the report were to be roughly positioned centrally between Cologne-Godorf and Bonn-Nord (red polygon), this report would completely contradict the numeric traffic situation data (green background) and would be completely discarded by the data merge.

In the case of a positioning using the method proposed here (dark blue polygon), the report is almost completely localized in the area of "not known" (light blue background) and consequently almost completely accepted by the data merge (see FIG. 3).

Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A method for merging imprecisely localized traffic reports with precisely localized traffic data, comprising the following steps:

obtaining, by a traffic determination device, an imprecisely localized traffic report indicating a disturbance within a region between a first point and a second point;

obtaining, by the traffic determination device, a precise traffic report corresponding to a region between a third point and a fourth point, wherein the region between the third point and the fourth point at least partially overlaps the region between the first point and the second point;

determining, by the traffic determination device, a first portion between the first point and the second point where the precise traffic report confirms the imprecisely localized traffic report, a second portion between the first point and the second point where the precise traffic report refutes the imprecisely localized traffic report, and a third portion between the first point and the second point where the precise traffic report neither confirms nor refutes the imprecisely localized traffic report;

estimating, by the traffic determination device, locations of two endpoints for the reported disturbance by solving an extremum problem based on applying weighting criteria to the first, second, and third portions; and merging, by the traffic determination device, the precise traffic report with the imprecisely localized traffic report between the estimated locations of the two endpoints, wherein the merging includes giving priority to the precise traffic report at locations where the precise traffic report conflicts with the imprecisely localized traffic report; and providing, by the traffic determination device, the result of the merging as a traffic situation estimate.

2. The method according to claim 1, wherein the first, second, and third portions are represented by b(x), w(x), and n(x), respectively, and the extremum problem comprises:

$$Ax'\in[x_1,x_2]:\{fapo(x')>fapo(x)\}\vee\{(fapo(x')=fapo(x))\wedge(x'>x)\},$$

$$fapo(x)=g_b b(x)+g_n n(x)+g_w w(x),$$

$$x_1=\min(km_1,km_3-L),$$

$$x_2=\min(km_1+L,km_3);$$

where:

$g_b$ is a weight of confirmation criterion;

$g_n$ is a weight of gap-closing criterion; and $g_w$ is a weight of refutation criterion.

3. A traffic determination device comprising a tangible, non-transitory computer-readable medium encoded with processing instructions for implementing a method for merging imprecisely localized traffic reports with precisely localized traffic data, the method comprising:

obtaining an imprecisely localized traffic report indicating a disturbance within a region between a first point and a second point;

obtaining a precise traffic report corresponding to a region between a third point and a fourth point, wherein the region between the third point and the fourth point at least partially overlaps the region between the first point and the second point;

determining a first portion between the first point and the second point where the precise traffic report confirms the imprecisely localized traffic report, a second portion between the first point and the second point where the precise traffic report refutes the imprecisely localized traffic report, and a third portion between the first point and the second point where the precise traffic report neither confirms nor refutes the imprecisely localized traffic report;

estimating locations of two endpoints for the reported disturbance by solving an extremum problem based on applying weighting criteria to the first, second, and third portions; and merging the precise traffic report with the imprecisely localized traffic report between the estimated locations of the two endpoints, wherein the merging includes giving priority to the precise traffic report at locations where the precise traffic report conflicts with the imprecisely localized traffic report; and providing the result of the merging as a traffic situation estimate.

* * * * *